United States Patent
Suh et al.

(10) Patent No.: US 12,485,407 B2
(45) Date of Patent: Dec. 2, 2025

(54) CATALYST FOR HYDROGENATION REACTION AND METHOD FOR PRODUCING SAME

(71) Applicants: LG CHEM, LTD., Seoul (KR); KOREA ADVANCED INSTITUTE OF SCIENCE AND TECHNOLOGY, Daejeon (KR)

(72) Inventors: Myungji Suh, Daejeon (KR); Dong Hyun Ko, Daejeon (KR); Minkee Choi, Daejeon (KR); Songhyun Lee, Seoul (KR)

(73) Assignees: LG CHEM, LTD, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/665,116

(22) Filed: May 15, 2024

(65) Prior Publication Data

US 2024/0299919 A1   Sep. 12, 2024

Related U.S. Application Data

(62) Division of application No. 17/428,551, filed as application No. PCT/KR2020/009185 on Jul. 13, 2020, now abandoned.

(30) Foreign Application Priority Data

Sep. 30, 2019   (KR) .......................... 10-2019-0120808

(51) Int. Cl.
*B01J 31/06*   (2006.01)
*B01J 23/44*   (2006.01)
(Continued)

(52) U.S. Cl.
CPC .............. *B01J 31/06* (2013.01); *B01J 23/44* (2013.01); *B01J 35/393* (2024.01); *B01J 37/04* (2013.01);
(Continued)

(58) Field of Classification Search
None
See application file for complete search history.

(56) References Cited

U.S. PATENT DOCUMENTS

| | | |
|---|---|---|
| 5,516,851 A | 5/1996 | Flick et al. |
| 2008/0269425 A1 | 10/2008 | Hirota et al. |

(Continued)

FOREIGN PATENT DOCUMENTS

| | | |
|---|---|---|
| CN | 104245132 A | 12/2014 |
| CN | 107722147 A | 2/2018 |

(Continued)

OTHER PUBLICATIONS

Yun et al. ACS Catalysis, 6, 2016, 2435-2442 (Year: 2016).*

(Continued)

*Primary Examiner* — Yun Qian
(74) *Attorney, Agent, or Firm* — Bryan Cave Leighton Paisner LLP (57) ABSTRACT

A catalyst for a hydrogenation reaction including: a polymer support; and a catalytic component supported on the polymer support. The polymer support comprises a repeating unit represented by Formula 1.

3 Claims, 5 Drawing Sheets (51) Int. Cl.
  *B01J 35/30*    (2024.01)
  *B01J 37/04*    (2006.01)
  *C07C 5/09*     (2006.01)
  *C08G 75/0209*  (2016.01)
  *C08G 75/0254*  (2016.01)
  *C08G 75/0295*  (2016.01)

(52) U.S. Cl.
  CPC ............ *C07C 5/09* (2013.01); *C08G 75/0209* (2013.01); *C08G 75/0254* (2013.01); *C08G 75/0295* (2013.01); *B01J 2235/00* (2024.01); *B01J 2235/05* (2024.01); *B01J 2235/30* (2024.01); *C07C 2523/44* (2013.01); *C07C 2531/06* (2013.01)

(56) References Cited

U.S. PATENT DOCUMENTS

| | | |
|---|---|---|
| 2008/0300436 A1 | 12/2008 | Cheung et al. |
| 2015/0051357 A1 | 2/2015 | Komati et al. |
| 2015/0231612 A1 | 8/2015 | Dai et al. |

FOREIGN PATENT DOCUMENTS

| | | |
|---|---|---|
| JP | 2008-272653 A | 11/2008 |
| JP | 2008-280495 A | 11/2008 |
| JP | 2014-030821 A | 2/2014 |
| KR | 2008-0035616 A | 4/2008 |
| KR | 2012-0117252 A | 10/2012 |
| KR | 2015-0041033 A | 4/2015 |
| WO | 2016038454 A1 | 3/2016 |

OTHER PUBLICATIONS

Yamamoto et al. "Sulfide bond formation for the synthesis of poly(thioarylene) through oxidation of sulfur chloride with aromatics," Macromolecules 1994, 27, 15, 4312-4317 Publication Date:Jul. 1, 1994 https://doi.org/10.1021/ma00093a036.

Santra et al. "A supported palladium nanocatalyst for copper free acyl Sonogashira reactions: One-pot multicomponent synthesis of N-containing heterocycles," Green Chem., 2011,13, 3238-3247.

Santra et al. Green Chemistry, 2011, 13, 3238), (Year: 2011).

Chen et al. Catalysis Communications, Supplementary material, 105, 16-19, (Year: 2018).

Yamamoto et al. Macromolecules and Supplementary material, 27, 4312-4317 (Year: 1994).

Yun et al., "Cross-Linked "Poisonous" Polymer: Thermochemically Stable Catalyst Support for Tuning Chemoselectivity" ACS Catalysis, vol. 6, No. 4 (2016) pp. 2435-2442.

Patel et al., "Highly Stable Nanoporous Sulfur-Bridged Covalent Organic Polymers for Carbon Dioxide Removal", Advanced Functional Materials, vol. 23, No. 18 (2013) pp. 2270-2276.

Tagle et al., "Polymerization By Phase-Transfer Catalysis 3*: POLY(1,4-OXYLYLENE Thioethers) Synthesis" Journal of Polymer Science: Part A: Polymer Chemistry, vol. 24 (1986) pp. 495-501.

Chen et al., "MnO2-Fe2O3 Catalysts Supported On Polyphenylene Sulfide Filter Felt By a Redox Method for the Low-Temperature No Reduction With NH3", Catalysis Communications, vol. 105 (Feb. 2018) pp. 16-19.

\* cited by examiner

CATALYST FOR HYDROGENATION REACTION AND METHOD FOR PRODUCING SAME

CROSS-REFERENCE TO RELATED APPLICATIONS

This application is a divisional of co-pending U.S. patent application Ser. No. 17/428,551, filed Aug. 4, 2021, which is a U.S. national stage of international Application No. PCT/KR2020/009185 filed on Jul. 13, 2020, and claims priority to and the benefit of Korean Patent Application No. 10-2019-0120808 filed in the Korean Intellectual Property Office on Sep. 30, 2019, the entire contents of which are incorporated herein by reference.

TECHNICAL FIELD

The present invention relates to a catalyst for a hydrogenation reaction and a method for manufacturing the same.

BACKGROUND

Oil refinery and petrochemical plants produce large amounts of hydrocarbons, which contain large amounts of unsaturated hydrocarbons and cause problems during subsequent process steps or storage periods. Examples of these unsaturated hydrocarbons comprise acetylene, propyne, propadiene, butadiene, vinylacetylene, butyne, phenylacetylene, styrene and the like.

As an example, acetylene is known to reduce the activity of a catalyst in an ethylene polymerization process, which results in the deterioration of the quality of a polymer. Therefore, in a process of synthesizing polyethylene from ethylene, the concentration of acetylene contained in ethylene raw materials needs to be reduced to the minimal level.

These undesired unsaturated compounds are usually removed to an amount of several PPM or less by a selective hydrogenation reaction. It is very important to enhance the selectivity of the desired compound from a reaction of selectively hydrogenating unsaturated compounds and avoid coke formation, which reduces the reaction activity.

In related art, nickel sulfate, tungsten/nickel sulfate or copper containing catalysts have been used for selective hydrogenation reactions. However, these catalysts have low catalytic activity even at high temperatures, and thus reduce polymer formation. Further, supported palladium (Pd) or Pd and silver (Ag) containing catalysts based on alumina or silica are also used in selective hydrogenation processes, but the selectivity is unsatisfactory or the activity is low.

Therefore, there is a need in the art for a catalyst for a hydrogenation reaction, which has excellent selectivity toward a product of hydrogenation reaction and excellent catalytic activity.

SUMMARY

The present application provides a catalyst for a hydrogenation reaction and a method for manufacturing the same.

An exemplary embodiment of the present application provides a catalyst for a hydrogenation reaction, the catalyst comprising:
 a polymer support; and
 a catalytic component supported on the polymer support,
 wherein the polymer support comprises a repeating unit represented by the following Formula 1:

[Formula 1]

In Formula 1:
 R1 to R4 are the same as or different from each other, and are each independently hydrogen, an alkyl group having 1 to 10 carbon atoms, or an aryl group having 6 to 20 carbon atoms, or adjacent groups can be bonded to each other to form a hydrocarbon ring.

Further, another exemplary embodiment of the present application provides a method for manufacturing a catalyst for a hydrogenation reaction, the method comprising:
 preparing a polymer support comprising the repeating unit represented by Formula 1; and
 supporting a catalytic component on the polymer support.

According to an exemplary embodiment of the present application, a polymer support comprising the repeating unit represented by Formula 1 can be applied as a support for a catalyst for a hydrogenation reaction.

Further, according to an exemplary embodiment of the present application, the catalyst comprising the polymer support has excellent stability when used at a temperature in the reaction temperature range of a hydrogenation reaction and improves the selectivity toward the product of the hydrogenation reaction.

In addition, a catalyst for a hydrogenation reaction according to an exemplary embodiment of the present application has reaction characteristics which are different from those of an alumina-or silica-based metal-supported catalyst described in related art. In an exemplary embodiment of the present application, the reaction occurs on the surface of the metal due to a strong bond between a polymer support comprising the repeating unit represented by Formula 1 and a hydrogen active metal cluster. The catalyst for a hydrogenation reaction according to an exemplary embodiment of the present application has excellent stability within a reaction temperature range of the hydrogenation reaction and improves the selectivity of alkene in the hydrogenation reaction of alkyne by suppressing the hydrogenation reactivity of alkene while maintaining the hydrogenation reactivity of alkyne.

DETAILED DESCRIPTION

Hereinafter, the present specification will be described in more detail.

When one member is disposed "on" another member in the present specification, this includes not only a case where the one member is brought into contact with another member, but also a case where still another member is present between the two members.

When one part "comprises" one constituent element in the present specification, unless otherwise specifically described, this does not mean that another constituent element is excluded, but means that another constituent element can be further included.

As described above, it is common to use a catalyst in which Pd is supported on an alumina or silica support as a catalyst for a hydrogenation reaction, as described in related art. However, such related art catalysts have a short catalyst replacement cycle due to the rapid deactivation of the catalyst, thereby increasing processing costs. Further, to improve the selectivity of the product of hydrogenation reaction in related art, a modifier was introduced, but the introduction of the modifier increases processing costs and requires an additional separation process.

Thus, the present application was intended to develop a catalyst for a hydrogenation reaction, which has excellent selectivity toward the product of a hydrogenation reaction and excellent catalytic activity. In particular, the present inventors have developed a catalyst comprising a polymer support applied to a catalyst for a hydrogenation reaction.

The catalyst for a hydrogenation reaction according to an exemplary embodiment of the present application comprises: a polymer support; and a catalytic component supported on the polymer support, in which the polymer support comprises a repeating unit represented by the following Formula 1:

[Formula 1]

In Formula 1:
R1 to R4 are the same as or different from each other, and are each independently hydrogen, an alkyl group having 1 to 10 carbon atoms, or an aryl group having 6 to 20 carbon atoms, or adjacent groups can be bonded to each other to form a hydrocarbon ring.

In an exemplary embodiment of the present application, "〜〜" in the formulae means a point where the repeating units are linked.

In an exemplary embodiment of the present application, the alkyl group of Formula 1 can be straight-chained or branched, and the number of carbon atoms thereof is not particularly limited, but is preferably 1 to 10. Specific examples of the alkyl group include a methyl group, an ethyl group, a propyl group, an isopropyl group, a butyl group, an n-butyl group, an isobutyl group, a tert-butyl group, a sec-butyl group, a 1-methylbutyl group, a 1-ethylbutyl group, and the like, but are not limited thereto.

In an exemplary embodiment of the present application, specific examples of the aryl groups of Formula 1 include a phenyl group, a biphenyl group, a terphenyl group, a quaterphenyl group, a naphthyl group, an anthracenyl group, a phenanthrenyl group, a pyrenyl group, and the like, but are not limited thereto.

In an exemplary embodiment of the present application, all of R1 to R4 of Formula 1 can be hydrogen.

In an exemplary embodiment of the present application, the hydrocarbon ring can be an aromatic hydrocarbon ring, and specific examples thereof include a benzene ring, and the like, but are not limited thereto.

In an exemplary embodiment of the present application, Formula 1 can be represented by any one of the following Formulae 2 to 9:

[Formula 2]

[Formula 3]

[Formula 4]

[Formula 5]

[Formula 6]

[Formula 7]

[Formula 8]

[Formula 9]

In an exemplary embodiment of the present application, a polymer support comprising the repeating unit represented by Formula 1 can have a weight average molecular weight of 25,000 g/mol to 50,000 g/mol.

According to an exemplary embodiment of the present application, it is possible to exhibit high selectivity compared to a hydrogenation catalyst using a related art alumina or silica support in a selective hydrogenation reaction such as hydrogenation of alkyne to alkene by supporting a hydrogen active metal (a metal capable of forming hydrogen activated by contact with hydrogen molecules) in the polymer support. As an example, in the hydrogenation reaction of alkyne to alkene, in the case of a related art alumina-or silica-based metal supported catalyst, both alkyne and alkene are easily adsorbed on the surface of the metal, so that hydrogenation of alkyne to alkene and hydrogenation of alkene to alkane are non-selectively accomplished. However, as in an exemplary embodiment of the present application, when the polymer support is used, the surface of an active metal is surrounded by the polymer due to the strong binding between the polymer support and the active metal. Therefore, based on the active metal, a reactant exhibiting a relatively stronger binding power than the binding power between the active metal and the polymer support, such as an alkyne, is adsorbed on the active metal, but reactants exhibiting a relatively weaker binding power, such as an alkene, cannot be adsorbed on the active metal. Due to these characteristics, a catalyst having an active metal supported on a polymer support can show high selectivity in a hydrogenation reaction of alkyne to alkene by suppressing the hydrogenation reactivity of alkene while maintaining the hydrogenation reactivity of alkyne.

In an exemplary embodiment of the present application, the catalytic component can include one or more of platinum (Pt), palladium (Pd), ruthenium (Ru), iron (Fe), nickel (Ni), cobalt (Co), molybdenum (Mo), gold (Au), silver (Ag), copper (Cu), titanium (Ti), gallium (Ga), cerium (Ce), aluminum (Al), zinc (Zn), and lanthanum (La).

In an exemplary embodiment of the present application, a content of the catalytic component can be 0.01 wt % to 10 wt % and 0.05 wt % to 5 wt %, based on a total weight of the catalyst for a hydrogenation reaction. When the content of the catalytic component is less than 0.01 wt % based on the total weight of the catalyst for a hydrogenation reaction, the reactivity of the catalyst can deteriorate. Further, when the content of the catalyst component is more than 10 wt %, the catalyst includes a relatively large amount of active metal compared to the polymer support, and the active metal cannot be easily bonded to the polymer support. Accordingly, the selectivity of alkene is lowered by hydrogenation reaction, and the actual benefit of the hydrogenation reaction caused by the increase in weight decreases.

A method for manufacturing a catalyst for a hydrogenation reaction according to an exemplary embodiment of the present application comprises: preparing a polymer support comprising the repeating unit represented by Formula 1; and supporting a catalytic component on the polymer support.

In an exemplary embodiment of the present application, the polymer support comprising the repeating unit represented by Formula 1 can be synthesized by condensation polymerization of a dihalogenated aromatic compound and a sulfur supply source in an N-methyl-2-pyrrolidone (NMP) solvent. As the dihalogenated aromatic compound, various types can be selected, and an example thereof includes p-dichlorobenzene, 2,5-dichlorotoluene, 1,4-dichloro-2,3,5, 6-tetramethylbenzene, and the like. Further, the sulfur supply source is not particularly limited as long as the sulfur supply source is a solid sulfur supply source, and examples thereof include $Na_2S$, $K_2S$, and the like. A molar ratio of the dihalogenated aromatic compound to sulfur of the sulfur supply source can be 0.5 to 1.5.

More specifically, the method for manufacturing a polymer support comprising the repeating unit represented by Formula 1 can include: evaporating water by heating a mixture comprising a sulfur supply source and an organic solvent; obtaining a polymerization reaction product by introducing a dihalogenated aromatic compound and an organic solvent into the mixture and performing a condensation polymerization reaction on the resulting mixture; and washing the polymerization reaction product with water and then drying the washed polymerization reaction product. In the step of evaporating of water by heating the mixture comprising the sulfur supply source and the organic solvent, water can be evaporated by heating and stirring the mixture at 180° C. to 220° C. for 1 hour to 3 hours. In the step of obtaining a polymerization reaction product by introducing a dihalogenated aromatic compound and an organic solvent into the mixture and performing a condensation polymerization reaction on the resulting mixture, the product can be polymerized by heating and stirring the mixture at 225° C. to 265° C. for 3 hours to 5 hours. In the step of washing the polymerization reaction product with water and then drying of the washed polymerization reaction product, the polymerization reaction product can be washed with water at 70° C. to 90° C. and dried at 80° C. to 100° C. for 6 hours to 12 hours.

In an exemplary embodiment of the present application, in the method for supporting a catalytic component on a polymer support, after an aqueous solution or organic solution (supporting solution) containing a compound as a precursor for the catalytic component is prepared, a catalyst can be synthesized by using an immersion method in which the polymer support is immersed in the supporting solution, dried, and then reduced with hydrogen gas, or by stirring the resulting polymer support with metal nanoparticles reduced in advance. As a precursor for the catalytic component, an organic metal compound such as $Pd(acac)_2$, $Pd(NO_3)_2 \cdot 4NH_3$, $Pt(acac)_2$, and $Pt(NO_3)_2 \cdot 4NH_3$ can be used, but the precursor is not limited thereto.

When the catalytic component is supported on the polymer support by the immersion method, an aqueous solution or an organic solution is prepared by dissolving a precursor for the catalytic component in water or an organic solvent in a volume corresponding to voids of the polymer support, a polymer support is immersed in the aqueous or organic solution, the solvent is completely evaporated, the resulting product is dried, and then the polymer is reduced while flowing hydrogen at a temperature at which the polymer is not impaired (<250° C.). Further, when metal nanoparticles reduced in advance are dispersed in an organic solvent, a polymer support is added to the solution, the solution is stirred and subjected to ultrasonic treatment, a catalyst is obtained by filtering the resulting solution until the color of the solution completely fades, and then the filtered product is dried.

In a method for manufacturing a catalyst for a hydrogenation reaction according to an exemplary embodiment of the present application, the polymer support comprising the repeating unit represented by Formula 1, the catalytic component, and the like are the same as those described above.

The catalyst according to an exemplary embodiment of the present application can be used in a hydrogenation reaction. For example, the catalyst can be applied to a hydrogenation reaction to prepare alkene from alkyne. The catalyst according to an exemplary embodiment of the present application can be used not only with acetylene, but also with a hydrocarbon compound having a triple bond. Examples of the hydrocarbon compound comprise propyne, butyne, pentyne, hexyne, heptyne, octyne, and the like. Furthermore, a hydrogenolysis reaction is suppressed in a compound comprising a functional group other than a triple bond or a double bond, for example, a compound having a benzene ring such as phenylacetylene, an alkyne compound having a carbonyl group, an alkyne compound having a carbonyl group, an alkyne compound having an alcohol group, an alkyne compound having an amine group, and the like, and only an alkyne group can be selectively hydrogenated to an alkene group.

Hereinafter, the present application will be described in detail with reference to Examples for specifically describing the present application. However, the Examples according to the present application can be modified in various forms, and it is not interpreted that the scope of the present application is limited to the Examples described in detail below. The Examples of the present application are provided for more completely explaining the present application to the person with ordinary skill in the art.

EXAMPLES

Synthesis Example 1

Synthesis of Polymer Comprising Repeating Unit Represented by Formula 2

After 127.2 g of sodium sulfide hydrate (61.3 wt % $Na_2S$) and 326.7 g of NMP were mixed, the resulting mixture was heated at 205° C. and dehydrated, and then 146.9 g of p-dichlorobenzene was mixed with the dehydrated mixture, and polymerization was performed under stirring at 245° C. for 3 hours. Thereafter, a polymerization reaction product was filtered, washed with water at 80° C., and then dried at 100° C. for 12 hours. The produced polymer is represented by "PH".

Synthesis Example 2

Synthesis of Polymer Comprising Repeating Unit Represented by Formula 3

A polymer was synthesized in the same manner as in Synthesis Example 1, except that 161.0 g of 2,5-dichlorotoluene was used instead of the p-dichlorobenzene.

Synthesis Example 3

Synthesis of Polymer Comprising Repeating Unit Represented by Formula 4

A polymer was synthesized in the same manner as in Synthesis Example 1, except that 286.0 g of 1,4-dibromonaphthalene was used instead of the p-dichlorobenzene.

Synthesis Example 4

Synthesis of Polymer Comprising Repeating Unit Represented by Formula 5

A polymer was synthesized in the same manner as in Synthesis Example 1, except that 175.1 g of 2,5-dichloro-p-xylene was used instead of the p-dichlorobenzene.

Synthesis Example 5

Synthesis of Polymer Comprising Repeating Unit Represented by Formula 6

A polymer was synthesized in the same manner as in Synthesis Example 1, except that 203.1 g of 1,4-dichloro-2,3,5,6-tetramethylbenzene was used instead of the p-dichlorobenzene.

Synthesis Example 6

Synthesis of Polymer Comprising Repeating Unit Represented by Formula 7

A polymer was synthesized in the same manner as in Synthesis Example 1, except that 554.3 g of 1,4-diiodo-2,5-dioctylbenzene was used instead of the p-dichlorobenzene.

Experimental Example 1

Structure and Characteristic Analysis of Synthesized Polymer Support

Figure 1:
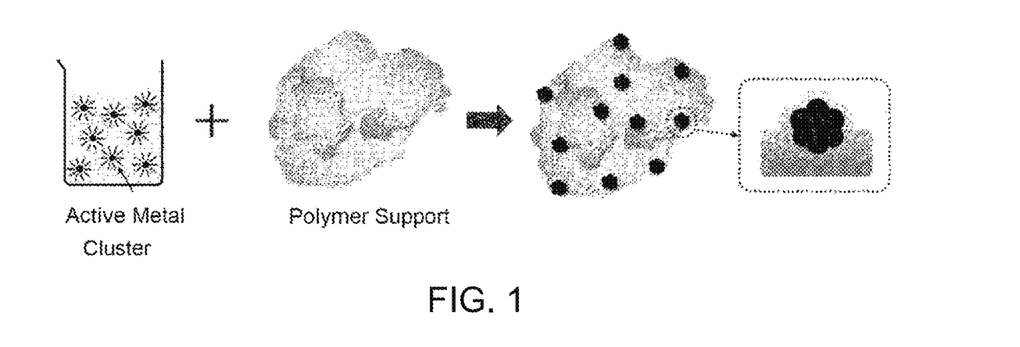
FIG. 1 is a schematic illustration of manufacturing method for a polymer support-based catalyst as according to an exemplary embodiment of the present application.
Figure 2:
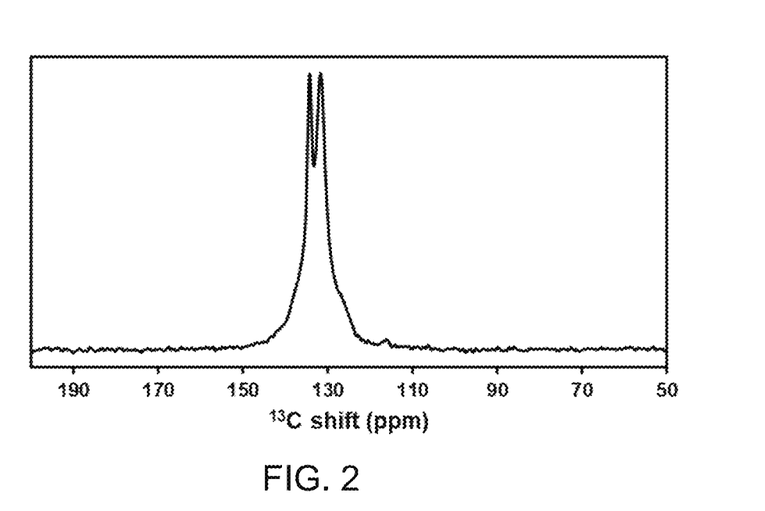
FIG. 2 is a cross polarization magic-angle spinning $^{13}$C nuclear magnetic resonance (CP/MAS $^{13}$C NMR) analysis spectrum of the polymer support according to Synthesis Example 1.

In order to confirm the structures of the polymer support produced in Synthesis Example 1, a $^{13}C$ NMR analysis was performed, and then the results thereof are shown in FIG. 2. As shown in FIG. 2, the synthesized polymer support has the same structure as Formula 2.

Figure 3:
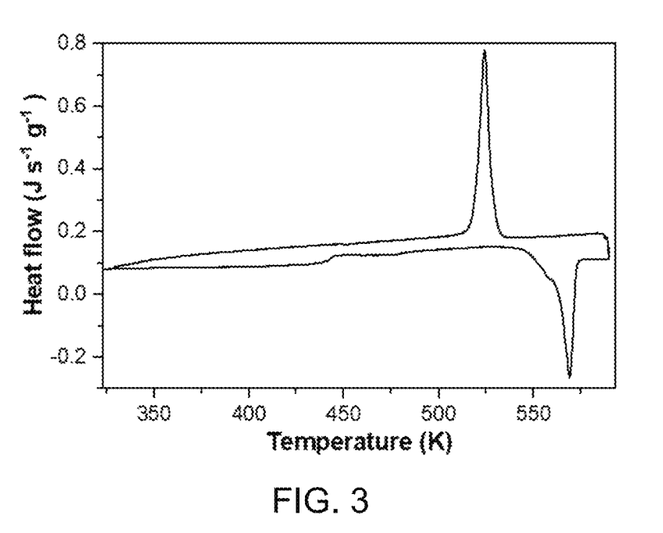
FIG. 3 is a graphical representation of the differential scanning calorimetry (DSC) analysis of the polymer support according to Synthesis Example 1.

For the analysis of the physical properties of the polymer support produced in Synthesis Example 1, a differential scanning calorimetry (DSC) analysis was performed, and the results thereof are shown in FIG. 3. As shown in FIG. 3, synthesized polymer support (PH) has a Tm of 296° C. and a Tc of 251° C.

Example 1

Manufacture of Polymer Support-Based Hydrogenation Catalyst

1) Synthesis of Palladium Cluster 15 ml of oleylamine and 75 mg of Pd(acac)$_2$ were mixed in an argon atmosphere and stirred at 60° C. for 1 hour. Thereafter, 300 mg of a borane tert-butylamine complex and 3 ml of an oleylamine mixture were put into the aforementioned mixture, and the resulting mixture was heated at 90° C. and stirred for 1 hour. Thereafter, 30 ml of ethanol was put into the mixture, and then a palladium cluster was obtained through centrifugation, and the obtained palladium cluster was dispersed in 20 ml of hexane and stored as a palladium-hexane solution.

2) Supporting Palladium Cluster on Polymer Support 1 g of the polymer support produced in Synthesis Example 1 was put into 50 ml of a hexane solution and stirred (a mixture A). 0.76 ml of the synthesized palladium-hexane solution and 50 ml of a hexane solution were mixed (a mixture B). The mixture B was slowly dropped onto the stirring mixture A, and then the resulting mixture was stirred for 2 hours. The stirred mixture was ultrasonicated for 2 hours, and then filtered, and dried at room temperature. The dried product was added to 30 ml of acetic acid, and the resulting mixture was stirred at 40° C. for 12 hours, filtered, washed with 300 ml of ethanol, and then dried at room temperature for 12 hours. The produced catalyst is represented by "Pd/PH".

Example 2

Synthesis of Catalyst Having Palladium Supported on Polymer Support

A process was performed in the same manner as in Example 1, except that the polymer support produced in Synthesis Example 2 was used instead of the polymer support produced in Synthesis Example 1.

Example 3

Synthesis of Catalyst Having Palladium Supported on Polymer Support

A process was performed in the same manner as in Example 1, except that the polymer support produced in Synthesis Example 3 was used instead of the polymer support produced in Synthesis Example 1.

Example 4

Synthesis of Catalyst Having Palladium Supported on Polymer Support

A process was performed in the same manner as in Example 1, except that the polymer support produced in Synthesis Example 4 was used instead of the polymer support produced in Synthesis Example 1.

Example 5

Synthesis of Catalyst Having Palladium Supported on Polymer Support

A process was performed in the same manner as in Example 1, except that the polymer support produced in Synthesis Example 5 was used instead of the polymer support produced in Synthesis Example 1.

Example 6

Synthesis of Catalyst Having Palladium Supported on Polymer Support

A process was performed in the same manner as in Example 1, except that the polymer support produced in Synthesis Example 6 was used instead of the polymer support produced in Synthesis Example 1.

Comparative Example 1

Synthesis of Catalyst Having Palladium Supported on Silica Support

A process was performed in the same manner as in Example 1, except that in Example 1, a commercially available silica (Aldrich, 236772) was used instead of the polymer support produced in Synthesis Example 1. The produced catalyst is represented by "Pd/SiO$_2$".

Experimental Example 2

Figure 4:
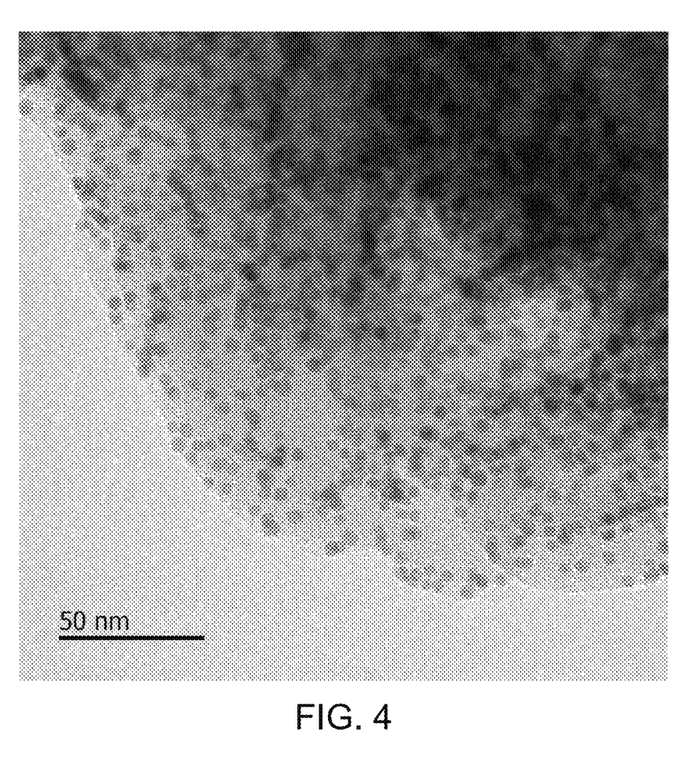
FIG. 4 is a transmission electron microscope (TEM) image of the catalysts according to Example 1.

Structure and Characteristic Analysis of Catalyst Having Metal Supported on Polymer Support In order to confirm the state of active metals supported on the polymer support in Examples 1, a transmission electron microscope (TEM) analysis was performed, and the results thereof are shown in FIG. 4. As shown in FIG. 4, palladium clusters having a diameter of about 4 nm are uniformly dispersed and present in the Pd/PH sample.

Figure 5:
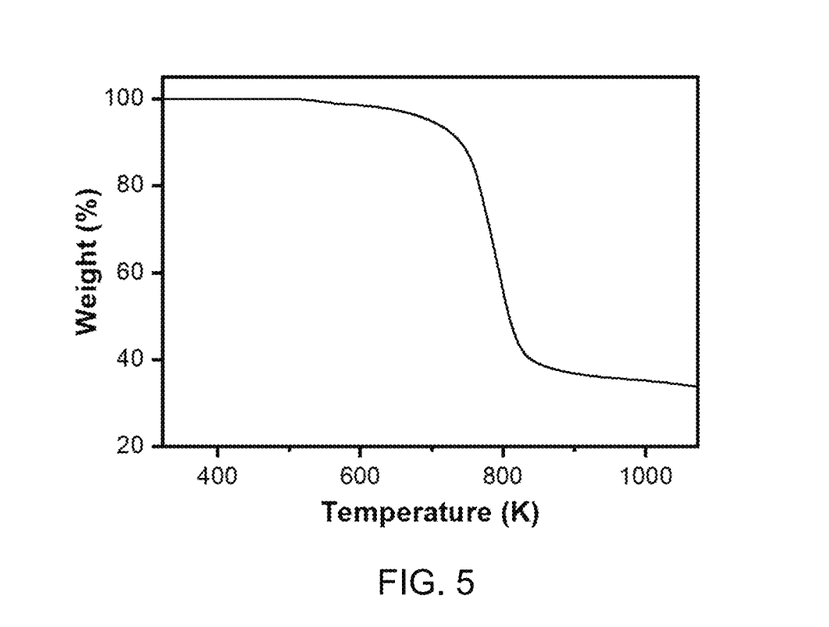
FIG. 5 is a graphical representation of the thermal gravimetric analysis (TGA) results of the catalyst according to Example 1 in a $H_2$ atmosphere.
Figure 8:
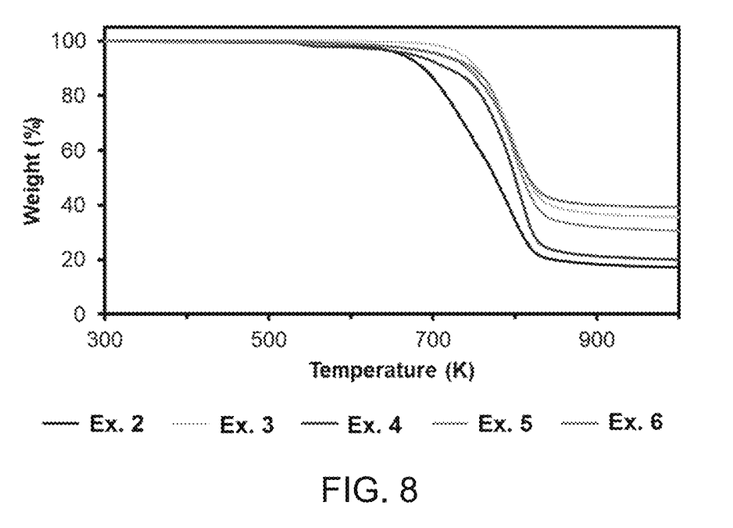
FIG. 8 is a graphical representation of the thermal gravimetric analysis (TGA) results of catalysts according to Examples 2 to 6 in a $H_2$ atmosphere.

In order to confirm the thermal stability of the polymer support-based hydrogenation catalysts in Examples 1 to 6, the produced catalysts were subjected to thermal gravimetric analysis (TGA) in a hydrogen atmosphere, and the results thereof are shown in FIGS. 5 and 8. More specifically, FIGS. 5 and 8 show the change in weight of the polymer supports as a function of the temperature as measured in a thermal gravimetric analyzer. FIGS. 5 and 8 are graphical representations of the change in weight of the polymer as the temperature increases in a hydrogen atmosphere. As shown in FIGS. 5 and 8, the polymer support was not decomposed up to about 240° C. in a hydrogen atmosphere, even though the hydrogen active metal was supported.

Experimental Example 3

Selective Hydrogenation Reaction of Acetylene Using Supported Catalyst

The activities of the supported catalysts produced in the Examples and the Comparative Example were confirmed by the following method.

A hydrogenation reaction of acetylene was performed under conditions of 1 atm, 100° C., and a weight hourly space velocity (WHSV) of 0.10 $g_{C2H2}\, g_{cat}^{-1} h^{-1}$ by feeding 0.6 kPa of acetylene, 49.3 kPa of ethylene, and 0.9 kPa of hydrogen-and nitrogen-based gases.

In order to analyze product components in the hydrogenation reaction, the product components were analyzed using gas chromatography. The conversion of a reactant (acetylene) and the selectivity of products (ethylene, ethane, and the like) were calculated by the following Equations 1 and 2:

[Equation 1]

Conversion (%) = (the number of moles of acetylene reacted) / (the number of moles of acetylene fed) × 100

[Equation 2]

Selectivity (%) = (the number of moles of product produced) / (the number of moles of acetylene reacted) × 100.

Figure 6A:
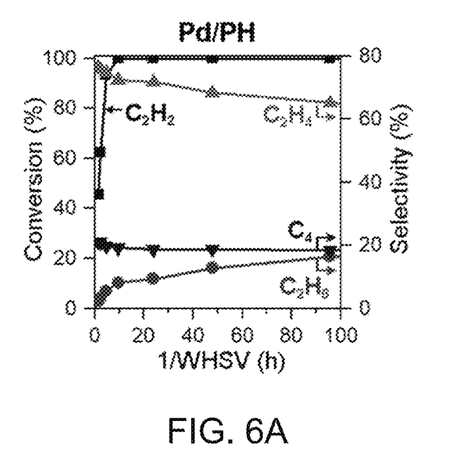
FIGS. 6A and 6B are graphical representations of the acetylene hydrogenation reaction results of the catalysts according to Example 1 and Comparative Example 1, respectively.
Figure 6B:
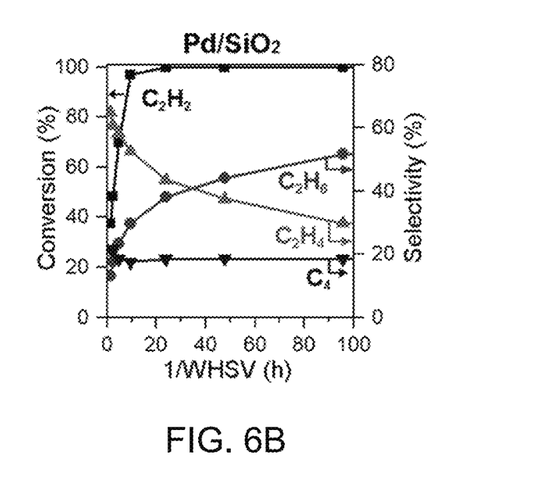
Figure 7A:
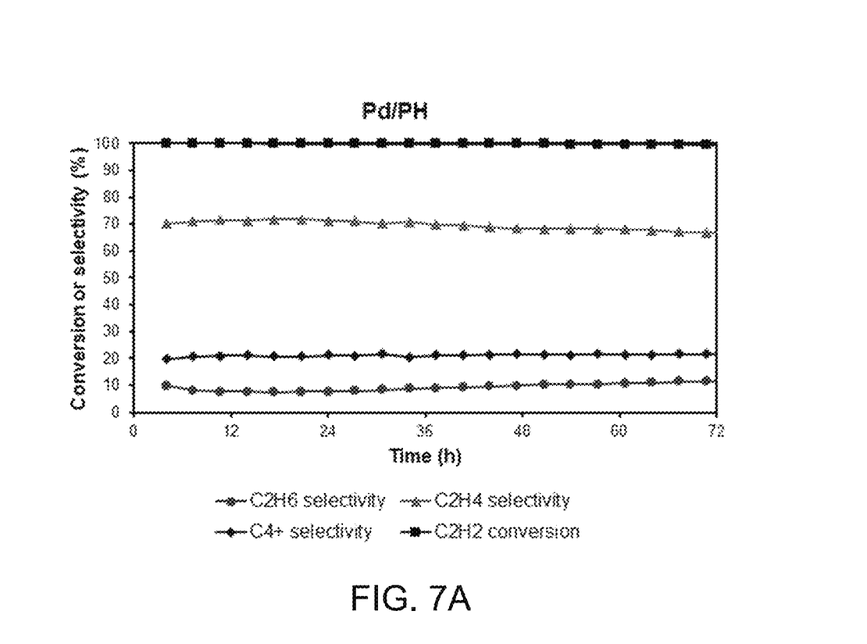
FIGS. 7A and 7B are graphical representations of the long-term reaction stability measurement reaction results of the acetylene hydrogenation catalysts according to Example 1 and Comparative Example 1, respectively.
Figure 7B:
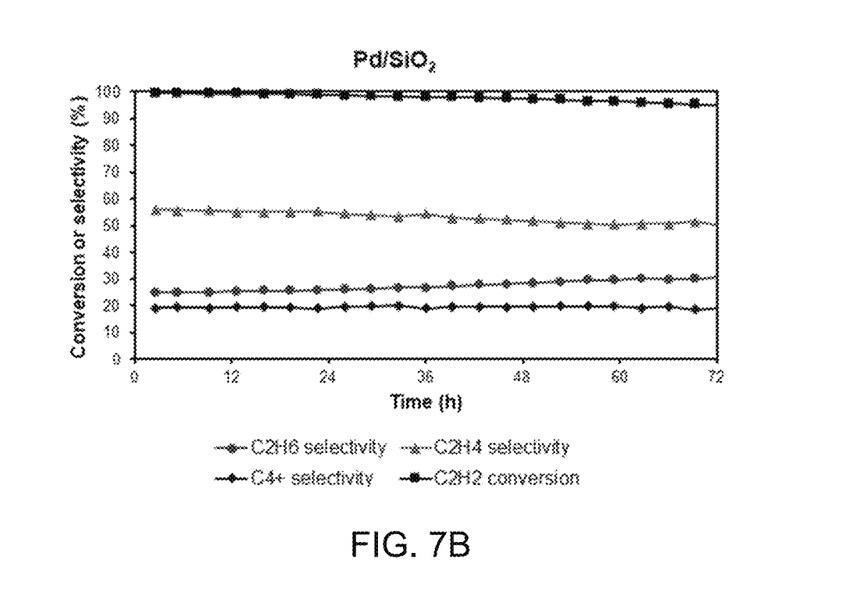

The acetylene hydrogenation reaction results using the catalysts produced in Examples 1 and Comparative Example 1 are shown in Table 1 and FIGS. 6A, 6B, 7A and 7B. More specifically, FIGS. 6A and 6B are graphical representations of the acetylene hydrogenation reaction results of the hydrogenation catalyst, and FIGS. 7A and 7B are graphical representations of the long-term reaction stability reaction results of the acetylene hydrogenation catalyst.

Analysis devices and analysis conditions applied in the present application are as follows.
1) Cross Polarization Magic-Angle Spinning $^{13}$C Nuclear Magnetic Resonance (CP/MAS $^{13}$C NMR)
  Used equipment: Avance III HD (400 MHZ) with wide bore 9.4 T magnet (Bruker)
  Analysis method: Larmor frequency of 100.66 MHZ, repetition delay time of 3 seconds. Chemical shifts were reported in ppm relative to tetramethyl silane (0 ppm)
2) Differential Scanning Calorimetry (DSC)
  Used equipment: DSC131 evo (Setaram)
  Analysis method: After a sample was placed on an alumina pan, the conversion was measured by regulating the temperature at a rate of 5 K/min from 313 K to 593 K.
3) Transmission Electron Microscope (TEM)
  Used equipment: JEM-2100F (JEOL) at 200 kV
4) Thermal Gravimetric Analysis (TGA)
  Used equipment: TGA N-1000 (Scinco)
  Analysis method: the conversion was measured by increasing the temperature at 5 K/min from 323 K to 1,025 K
5) Gas Chromatography (GC)
  Used equipment: YL6500 (Youngin)
  Analysis method: on-line GC, equipped with flame ionized detector (FID), GS-GasPro (Agilent) column was used

TABLE 1

| Type of catalyst | Reaction time | Acetylene Conversion (%) | Ethane Selectivity (%) | Ethylene Selectivity (%) | Others (C$_4$) Selectivity (%) |
|---|---|---|---|---|---|
| Example 1 | Day 1 | 99.8 | 7.65 | 71.3 | 21.1 |
| Example 1 | Day 2 | 99.7 | 9.98 | 68.5 | 21.5 |
| Example 1 | Day 3 | 99.4 | 11.5 | 66.8 | 21.7 |
| Example 2 | Day 1 | 98.7 | 8.43 | 70.3 | 21.3 |
| Example 3 | Day 1 | 91.4 | 11.7 | 66.6 | 21.7 |
| Example 4 | Day 1 | 98.7 | 8.1 | 70.1 | 21.8 |
| Example 5 | Day 1 | 96.6 | 7.3 | 71.0 | 21.7 |
| Example 6 | Day 1 | 90.3 | 11.5 | 65.7 | 22.8 |
| Comparative Example 1 | Day 1 | 98.6 | 26.0 | 54.4 | 19.6 |
| Comparative Example 1 | Day 2 | 97.1 | 28.9 | 51.2 | 19.9 |

TABLE 1-continued

| Type of catalyst | Reaction time | Acetylene Conversion (%) | Ethane Selectivity (%) | Ethylene Selectivity (%) | Others (C$_4$) Selectivity (%) |
|---|---|---|---|---|---|
| Comparative Example 1 | Day 3 | 94.0 | 31.8 | 48.1 | 20.1 |

As shown by these results, the catalyst for a hydrogenation reaction according to an exemplary embodiment of the present application maintains a high ethylene selectivity for a long period of time and has a very slow inactivation degree Compared to a Pd/SiO2 catalyst using silica as a support, as described in related art.

From the experimental results using the polymer support comprising the repeating unit represented by any one of Formulae 2 to 7, similar effects can be obtained even when a functional group such as another alkyl group and aryl group having a similar action principle is additionally bonded to a repeating unit represented by Formula 1.

Therefore, according to an exemplary embodiment of the present application, a polymer support comprising the repeating unit represented by Formula 1 can be applied as a support of a catalyst for a hydrogenation reaction.

Further, according to an exemplary embodiment of the present application, the catalyst comprising the polymer support has excellent stability when used at a temperature within the reaction temperature range of a hydrogenation reaction and improves the selectivity toward the product of the hydrogenation reaction.

The invention claimed is:
1. A method for manufacturing alkene, the method comprising:
  hydrogenating alkyne under a catalyst for a hydrogenation reaction to manufacture alkene,
  wherein the catalyst comprises a polymer support and a catalytic component comprising one or more of platinum, palladium, ruthenium, iron, nickel, cobalt, molybdenum, gold, silver, copper, titanium, gallium, cerium, aluminum, zinc, and lanthanum supported on the polymer support,
  wherein the polymer support consists of a repeating unit represented by any one of the following Chemical Formulae 2 to 9, and
  wherein the polymer support has a weight average molecular weight of 25,000 g/mol to 50,000 g/mol:

[Formula 2]

[Formula 3]

[Formula 4]

[Formula 5]

[Formula 6]

[Formula 7]

[Formula 8]

[Formula 9]

wherein in the Chemical Formulae 2 to 9,
~~~ means a point of attachment between the repeating units, and
a terminate group is a hydrogen atom.

2. The method of claim 1, wherein an amount of the catalytic component is 0.01 wt. % to 10 wt. % based on a total weight of the catalyst for a hydrogenation reaction.

3. The method of claim 1, wherein the alkyne is acetylene, propyne, butyne, pentyne, hexyne, heptyne or octyne.

* * * * *